United States Patent

Rus

[11] Patent Number: 5,641,202
[45] Date of Patent: Jun. 24, 1997

[54] RELEASE LATCH FOR UTILITY SEAT

[75] Inventor: Liviu Rus, Troy, Mich.

[73] Assignee: Lear Seating Corporation, Southfield, Mich.

[21] Appl. No.: 585,763

[22] Filed: Jan. 16, 1996

[51] Int. Cl.$^6$ ..................................................... B60N 2/30
[52] U.S. Cl. .................. 297/335; 297/378.12; 297/336; 296/65.1
[58] Field of Search .................................. 297/331, 335, 297/336, 378.12; 296/63, 65.1

[56] References Cited

U.S. PATENT DOCUMENTS

| | | |
|---|---|---|
| 3,001,820 | 9/1961 | Morphew . |
| 4,124,250 | 11/1978 | Weinich . |
| 4,484,776 | 11/1984 | Gokimoto et al. ................ 296/65.1 |
| 4,637,653 | 1/1987 | Yoshida et al. . |
| 5,044,683 | 9/1991 | Parsson . |
| 5,466,048 | 11/1995 | Fowler et al. ................ 297/336 X |

FOREIGN PATENT DOCUMENTS

| | | |
|---|---|---|
| 2471162 | 6/1981 | France ................ 296/65.1 |
| 8205851 | 4/1983 | France . |
| 2577860 | 8/1986 | France ................ 296/65.1 |
| 2005633 | 2/1970 | Germany . |
| 3531857 | 3/1987 | Germany ................ 297/336 |
| 644547 | 1/1989 | Japan . |

*Primary Examiner*—Peter R. Brown
*Attorney, Agent, or Firm*—Howard & Howard

[57] ABSTRACT

A passenger seat assembly (10) for a motor vehicle which can be folded to a stowed position for increasing cargo capacity includes a seat cushion (12) and a backrest cushion (14). The seat cushion (12) can move between horizontal use and vertical stowed positions, and the backrest cushion (14) can similarly move between vertical use and horizontal stowed positions. A displacement cam (64) is connected to the seat cushion (12). A pawl (46) locks the backrest cushion (14) in its vertical use position. A flexible motion transmitting core element (52) is attached at one end to the pawl (46) and at the other end to a slug (70). The slug (70) rides in an arcuate receiver slot (68) of the displacement cam (64). When the seat cushion (12) is manually pulled from its horizontal use position, the displacement cam (64) is rotated, causing the receiver slot (68) to slide over the slug (70). This lost motion continues for approximately 30° of movement until the slug (70) bottoms in the receiver slot (68), at which point the core element (52) is tensioned and begins pulling the pawl (46) toward an unlocked condition. At approximately 45° rotation of the seat cushion (12) away from its horizontal use position, the pawl (46) fully unlocks the backrest cushion (14). Conversely, when the seat assembly (10) is returned to the normal use condition from the stowed condition, the pawl (46) relocks the backrest cushion (14) in its vertical use position as soon as the seat cushion (12) reaches approximately 45° rotation away from its horizontal use position. This arrangement eases operation and manipulation of the seat assembly (10) to the stowed position, ensures occupant safety, and also eliminates the need to precisely control tolerances.

15 Claims, 4 Drawing Sheets

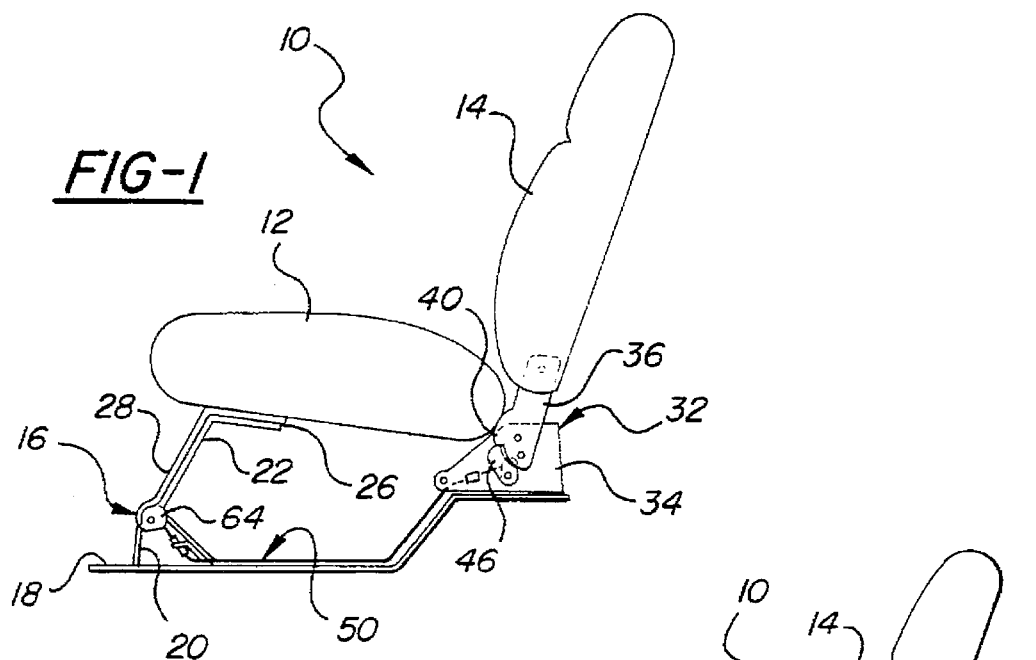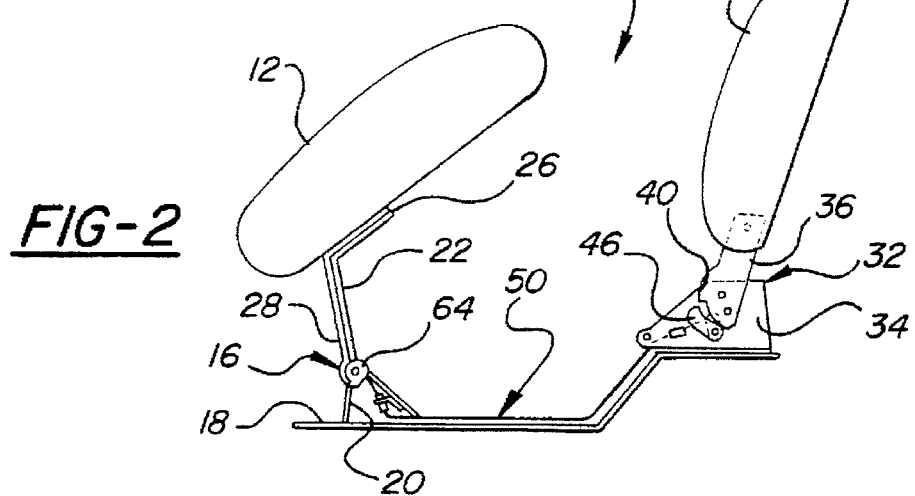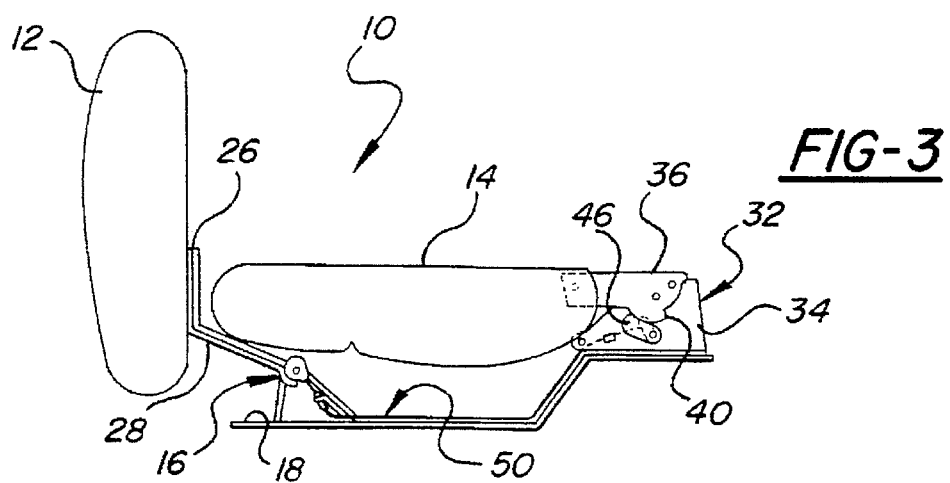

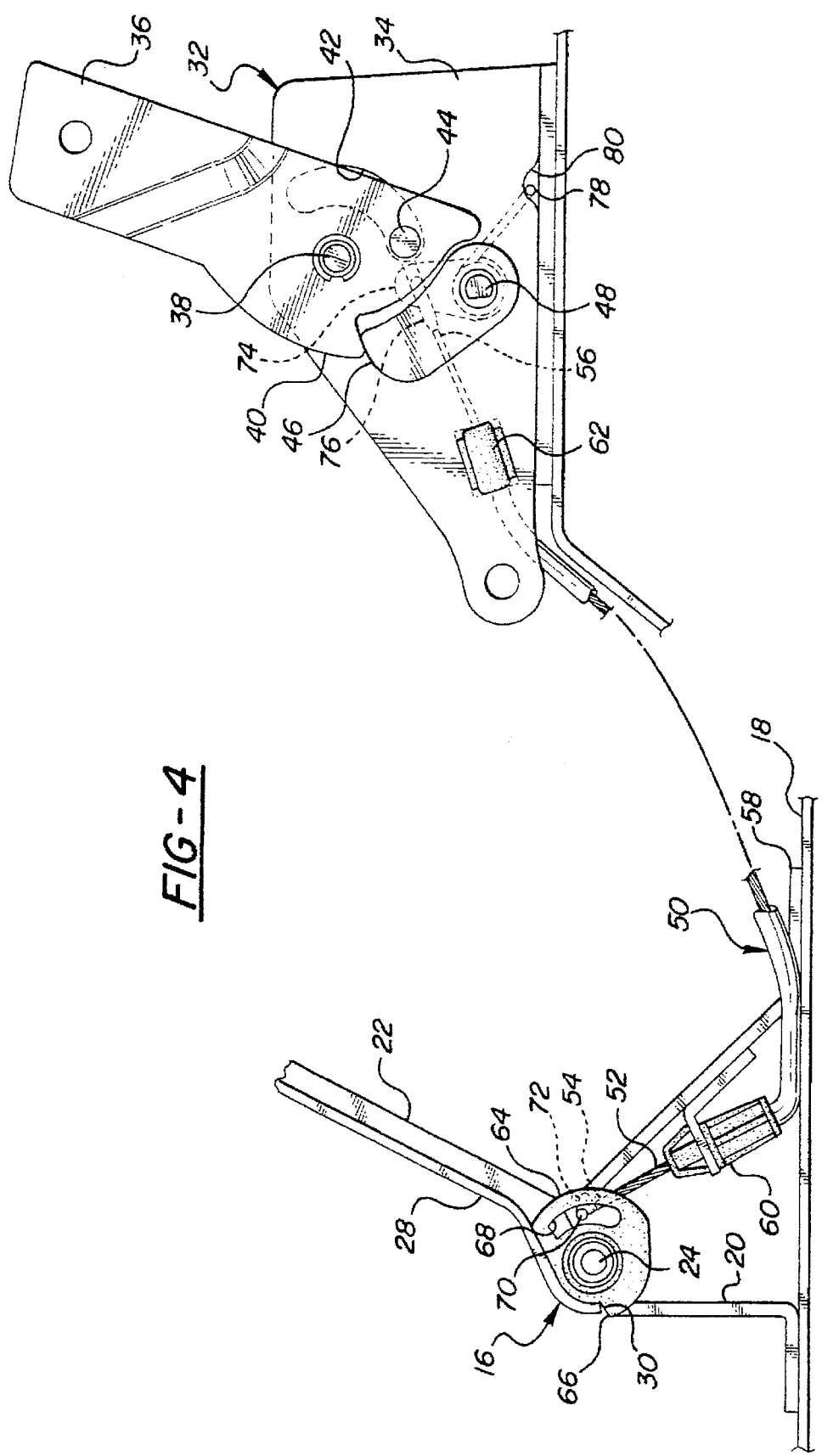

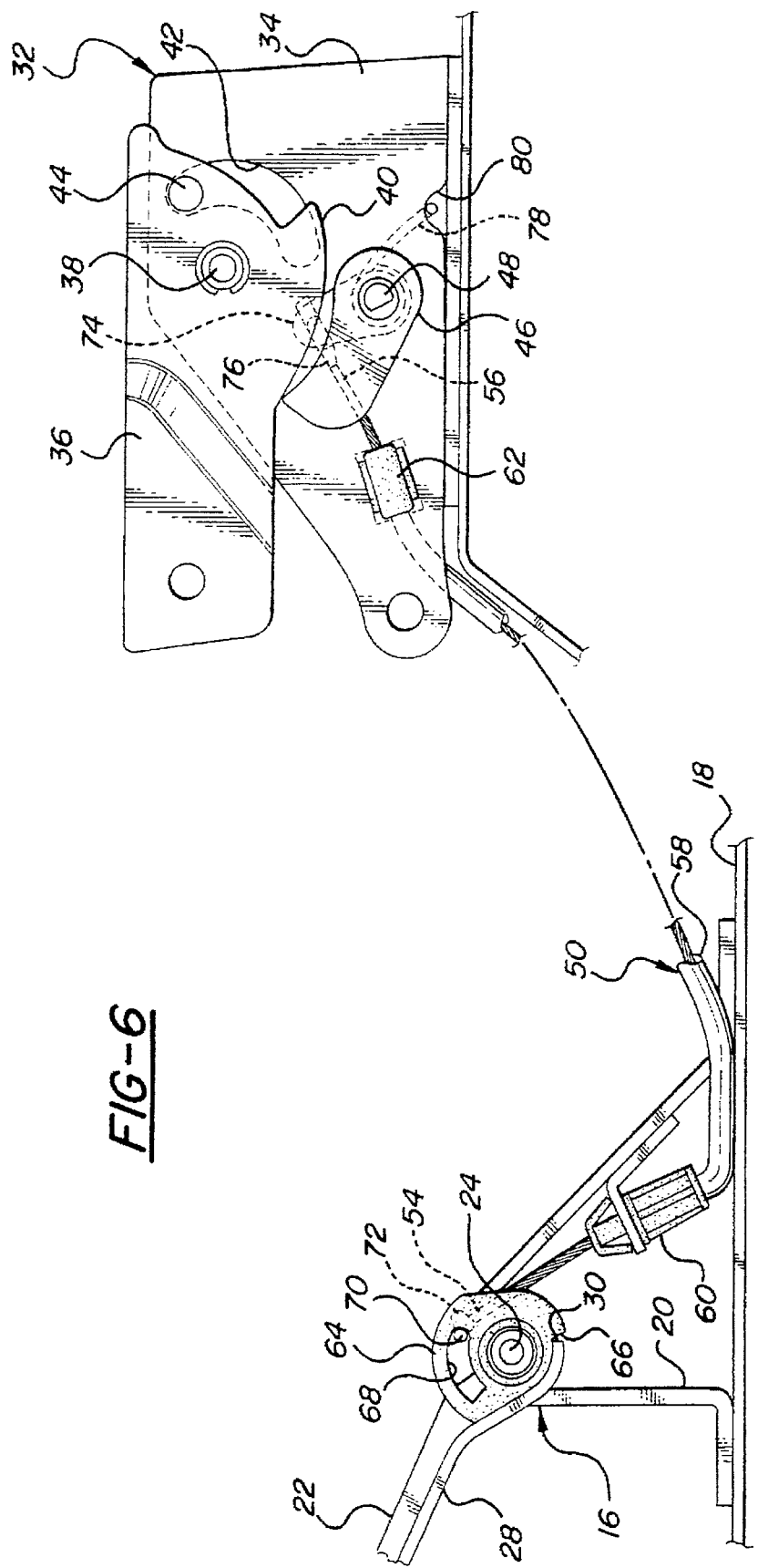

5,641,202

RELEASE LATCH FOR UTILITY SEAT

TECHNICAL FIELD

The subject invention relates generally to a vehicular seat assembly having a seat cushion and backrest cushion which can be moved from a normal use position to a stowed position, and more particularly to an improved release latch for the backrest cushion which is automatically actuated by movement of the seat cushion.

BACKGROUND OF THE INVENTION

Many motor vehicles, and in particular the sport/utility type vehicles, are provided with seat assemblies in the rear passenger compartment. Often, these seat assemblies are designed to fold or collapse to a non-use stowed position for increased cargo carrying capacity. In one such variation, the seat cushion portion of the seat assembly is hinged to the floor adjacent its forward edge so that it folds forwardly to a vertical stowed position. Similarly, the backrest cushion portion of the seat assembly is hinged to the floor so that it folds forwardly to a horizontal stowed position next to the seat cushion, thus forming a flat cargo receiving surface over its backside.

Of particular concern is the ease with which a person can manipulate the seat and backrest cushions to move the seat assembly between its normal use and stowed positions, while maintaining the highest levels of safety. The prior art has taught to provide a manual release latch for unlocking the seat and backrest cushions from their normal use positions. For example, reference may be had to U.S. Pat. No. 4,124,250 to Weinich, issued Nov. 7, 1978. Such manual release levers are cumbersome to operate, especially in the dark or in cold weather, and also when the person is unfamiliar with the seat assembly. Furthermore, such release lever mechanisms tend to add significantly to the cost of the seat assembly because they must be linked to both ends of the seat assembly.

The prior art U.S. Pat. No. 3,001,820 to Morphew, issued Sept. 26, 1961, teaches that the seat cushion and backrest cushion can be linked together without a manual release lever, thus causing the backrest and seat cushions to move in concert toward the stowed position. This arrangement, however, has several drawbacks. Namely, the seat assembly must be dimensioned to allow both cushions to move at the same time. Also, this design is more cumbersome to move to and from its stowed position because both seat and backrest cushions are moved at the same time. Furthermore, there is a potential safety concern that an obstruction below the seat cushion may prevent the backrest cushion from securely latching in place when the seat assembly is moved back to its normal use position.

SUMMARY OF THE INVENTION AND ADVANTAGES

The subject invention relates to a passenger seat assembly for a motor vehicle which can be folded to a stowed position for increasing cargo capacity inside the vehicle. The assembly comprises a seat cushion and a backrest cushion. A seat support means supports the seat cushion above a vehicle floor movably between a generally horizontal use position and a generally vertical stowed position. Similarly, a backrest support means supports the backrest cushion adjacent the seat cushion movably between a generally vertical use position and a generally horizontal stowed position overlying the horizontal use position of the seat cushion. A latch means is operatively associated with the backrest support means for selectively locking the backrest cushion in its vertical use position. The improvement of the subject invention comprises a delayed interlock means for automatically unlocking the latch means in response to movement of the seat cushion after the seat cushion is moved from its horizontal use position and for automatically relocking the latch means in response to movement of the seat cushion before the seat cushion is moved to its horizontal use position such that the latch means is unlocked and relocked by the seat cushion only when spaced from its horizontal use position.

In moving toward the stowed condition, the delayed interlock means of the subject invention unlocks the backrest cushion from its vertical use position only after the seat cushion has been moved a sufficient distance from its horizontal use position, and conversely in moving back to the normal use condition relocks the backrest cushion in its vertical use position long before the seat cushion reaches its horizontal use position. It is generally not desirable to actuate the latch means to release or unlock the backrest cushion from its vertical use position until the seat cushion has been moved a sufficient distance away from its horizontal stored position. This eases operation and manipulation of the seat assembly to the stowed position because the latch means is not actuated simultaneously with movement of the seat cushion. The most resistance and cumbersome moment in the transition from normal use to stowed conditions of the seat assembly occurs when initially moving the seat cushion from its horizontal use position, where the rear edge of the seat cushion may be snugly wedged under the lower edge of the backrest cushion. Similarly, it is not desirable to relock the backrest cushion in its vertical use position until the seat cushion is yet a sufficient distance away from its horizontal stored position. This latter consideration is primarily for occupant safety reasons to ensure that the latch means relocks well before the seat cushion nears its horizontal use position, but also for engineering economy reasons to avoid the necessity of precisely controlling tolerances. Therefore, if an obstruction under the seat cushion inadvertently prevents the seat cushion from fully reaching its horizontal use position, the backrest cushion will nevertheless be locked in its vertical use position thus ensuring occupant safety.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of a seat assembly according to the subject invention showing the seat and backrest cushions in their respective normal use positions;

FIG. 2 is a side view as in FIG. 1 but showing the seat cushion moved approximately midway between its horizontal use and vertical stowed positions to unlock the backrest cushion;

FIG. 3 is a side view as in FIGS. 1 and 2 but showing the seat and backrest cushions in their respective stowed positions;

FIG. 4 (is an enlarged fragmentary view of the delayed interlock means when the seat and backrest cushions are in their respective normal use positions as in FIG. 1;

FIG. 6 is an enlarged fragmentary view of the delayed interlock means when the seat and backrest cushions are in their respective stowed positions as in FIG. 3.

DETAILED DESCRIPTION OF THE PREFERRED EMBODIMENT

Figure 5:
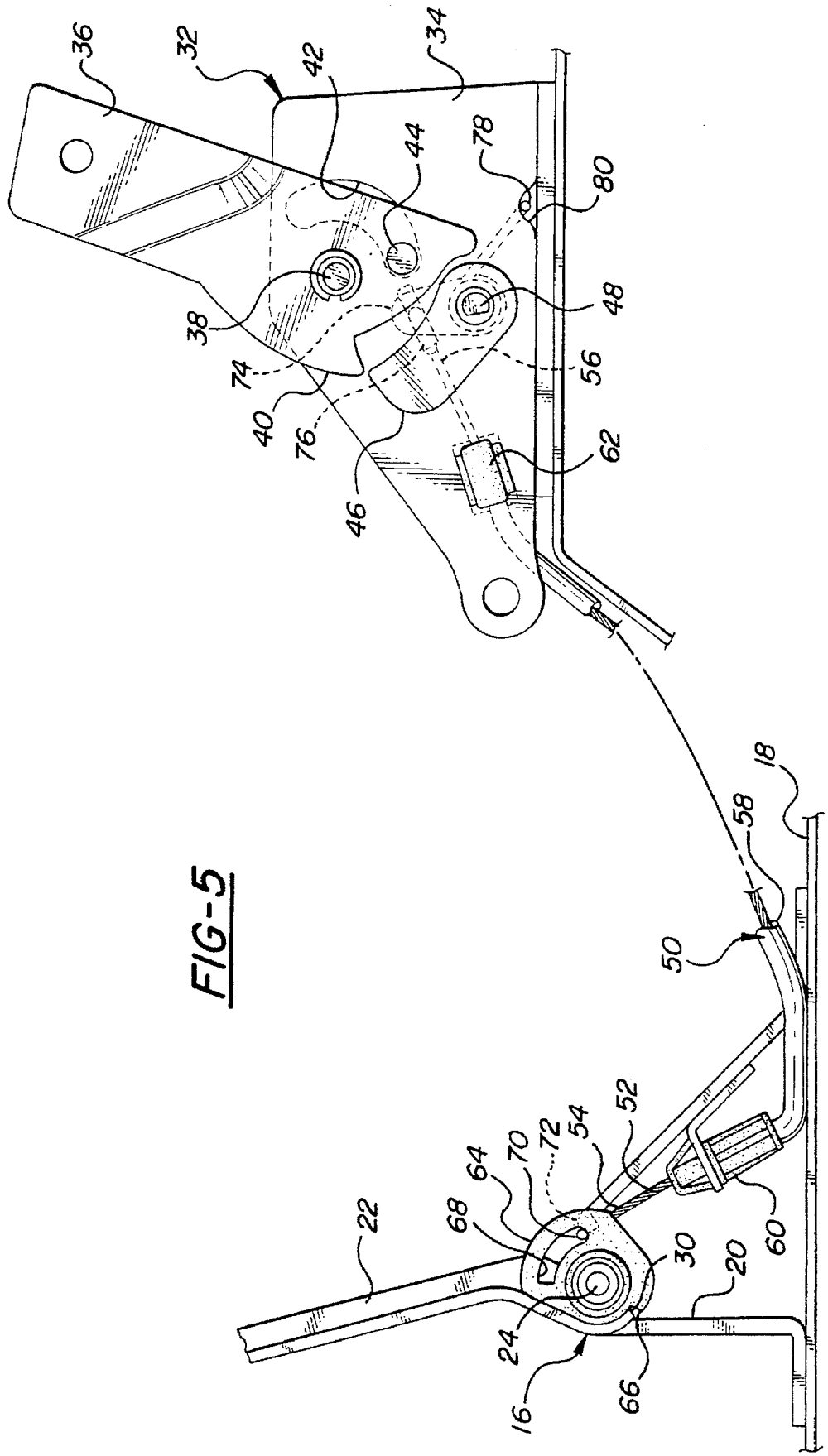
FIG. 5 is an enlarged fragmentary view of the delayed interlock means when the seat cushion moved approximately midway between its horizontal use and vertical stowed positions to unlock the backrest cushion as in FIG. 2.

Referring to the Figures, wherein like numerals indicate like or corresponding parts throughout the several views, a passenger seat assembly for a motor vehicle is generally shown at 10. The seat assembly 10 is of the type for placement in the rear area of a passenger compartment in the motor vehicle, and one which can be folded from a normal use position to a stowed position for increasing cargo capacity in the passenger compartment. The seat assembly 10 can be of any know type and construction, such as a full rear bench seat or the so-called 60/40 split rear bench seat or even a single occupant seat. The seat assembly 10 includes a seat cushion 12 and a backrest cushion 14. The seat cushion 12 and backrest cushion 14 are of the usual construction including an inner frame and spring suspension assembly (not shown) covered with foam and fabric.

A seat support means, generally indicated at 16, supports the seat cushion 12 above a vehicle floor 18 so that the seat cushion 12 can move between a generally horizontal use position (FIG. 1) and a generally vertical stowed position (FIG. 3). Although not shown, the seat cushion 12 may include a small loop-type strap stitched adjacent its rearward edge to facilitate pulling the seat cushion 12 from its horizontal use position toward its vertical stowed position. The seat support means 16 includes a first base plate 20 and a seat bracket 22 pivotally connected to the first base plate 20 by a first axle 24. In the preferred embodiment, a seat support means 16 is disposed on each end of the seat cushion 12. However, only one such seat support means 16 will be referred to for purposes of clarity. The first base plate 20 has a substantially flat mounting plate 26 which extends in dog-leg fashion from an arm 28. The mounting plate 26 is attached with suitable fasteners or by welding to the underside of the seat cushion 12, adjacent its forward edge. The arm 28 includes a catch 30 near the first axle 24 for reasons to be addressed subsequently.

A backrest support means, generally indicated at 32, supports the backrest cushion 14 above the vehicle floor 18 and adjacent the seat cushion 12. The backrest support means 32 is constructed to allow movement of the backrest cushion 14 between a generally vertical use position (FIGS. 1 and 2) and a generally horizontal stowed position (FIG. 3) overlying the horizontal use position of the seat cushion 12. In the preferred embodiment, a backrest support means 32 is disposed on each end of the backrest cushion 14. However, the following description will refer to only one such backrest support means 32 for purposes of clarity. The backrest support means 32 includes a second base plate 34 and a backrest bracket 36 pivotally connected to the second base plate 34 by a second axle 38. An enlarged tooth 40 extends from the backrest bracket 36. An arcuate track 42 is formed in the second base plate 34, centered about the second axle 38. A stop pin 44 extending from the backrest bracket 36 is positioned in the track 42 to establish the limits of travel of the backrest cushion 14 between the vertical use and horizontal stowed positions.

A latch means is operatively associated with the backrest support means 32 for selectively locking the backrest cushion 14 in its vertical use position shown in FIG. 1. The latch means, as best shown in FIGS. 4-6, includes a pawl 46 which is pivotally carried on the second base plate 34 by a shaft 48. The shaft 48 includes at least one flat to key it together with the pawl 46. The pawl 46 is positioned so that it is engagable with the tooth 40 of the backrest bracket 36 when the backrest cushion 14 is in the vertical use position, best shown in FIG. 4. However, the pawl 46 can be pivoted downwardly, away from the second axle 38 as shown in FIGS. 5 and 6, to clear the tooth 40 and thereby allow the backrest cushion 14 to move toward the horizontal stowed position of FIG. 3.

A delayed interlock means, generally indicated at 50, automatically actuates the pawl 46 in response to movement of the seat cushion 12 to a location spaced between its horizontal use and vertical stowed positions to unlock and relock the latch means by moving the seat cushion 12 at a spaced distance from its horizontal use position. It is not desirable to actuate the pawl 46 from its locked condition with the tooth 40 until the seat cushion 12 has been moved a sufficient away from its horizontal stored position to facilitate manipulation of the seat cushion 12. Likewise, it is not desirable to relock the backrest cushion 14 in its vertical use position until the seat cushion 12 is yet a sufficient distance away from its horizontal stored position. This latter consideration is primarily for occupant safety reasons to ensure that the pawl 46 relocks under the tooth 40 well before the seat cushion 12 nears its horizontal use position (FIG. 1), but also for engineering economy reasons to avoid the necessity of precisely controlling tolerances. In other words, stowed condition the delayed interlock means of the subject invention unlocks the backrest cushion 14 from its vertical use position only after the seat cushion 12 has been moved a sufficient distance from its horizontal use position, and conversely relocks the backrest cushion 14 in its vertical use position long before the seat cushion 12 reaches its horizontal use position. Therefore, if an obstruction under the seat cushion 12 inadvertently prevents the seat cushion 12 from fully reaching its horizontal use position shown in FIG. 1, the backrest cushion 14 will nevertheless be locked in its vertical use position thus ensuring safety.

The delayed interlock means 50 includes a flexible motion transmitting core element 52 having a first end 54 operatively connected to the seat support means 16 and a second end 56 operatively connected to the latch means. The core element 52 is preferably disposed within a protective sheath-like conduit 58. The conduit may be of the composite type having an inner tubular liner defining the internal boundaries of a core passage, at least one metallic supportive lay wire wrapped helically about the liner, and an outer cover disposed about the lay wire. Of course, those skilled in the art will readily appreciated other and alternative constructions of the core element 52 and conduit 58. The conduit 58 includes end fittings 60, 62 attached respectively adjacent the first 54 and second 56 ends of the core element 52. The end fittings 60, 62 may be of any known type for conveniently and securely attaching the conduit 58 to a support structure such as the first 20 and second 34 base plates. Preferably, the end fitting 60 is of the well know axial push-in type, and the end fitting 62 is of the well known lateral push-in type as shown and described in U.S. Pat. No. 4,011,770 to Webb, issued Mar. 15, 1977, the disclosure of which is hereby incorporated by reference.

The delayed interlock means 50 further includes a displacement cam 64 connected to the first end 54 of the core element. The displacement cam 64 is disposed about the first axle 24 for pivoting movement with the seat bracket 22. More specifically, the catch 30 on the arm 28 of the seat bracket 22 is engagable with a ledge 66 on the displacement cam 64. When the seat cushion 12 is pulled from its horizontal use position (FIG. 1), the ledge 66 engages the catch 30 on the displacement cam 64, forcing the displacement cam 64 to rotate with the seat bracket 22 about the first axle 24. The displacement cam 64 includes an elongated receiver slot 68 which is arcuate and centered about the first axle 24.

The first end 54 of the core element 52 includes a T-shaped slug 70 slidably disposed in the receiver slot 68. The slug 70 is provided with an anti-rotation fin 72 to prevent the slug 70 from accidentally twisting and as a result dislodging from the receiver slot 68. The anti-rotation fin 72 rides in a central groove formed in either side of the receiver slot 68. Preferably, the slug 70 is cast of a zinc alloy in place over the first end 54 of the core element 52.

When the seat cushion 12 is in its horizontal use position (FIG. 1), the slug 70 is positioned approximately in the middle of the receiver slot 68 as shown in FIG. 4. In the preferred embodiment, the slug 70 contacts the end of the receiver slot 68 when the seat cushion has been moved approximately 30° from its horizontal use position, and with continued movement of the seat cushion to approximately 45° from its horizontal use position, the core element 52 is pulled sufficiently to unlock the pawl 46 from the tooth 40 (as shown in FIG. 5). In other words, the displacement cam 64 moves approximately 30° before imparting motion to the slug 70, i.e., 30° of lost motion before pulling the core element 52. Further movement of the seat cushion 12 to its vertical stowed position (FIG. 3), causes displacement of the pawl 46 to the extreme position shown in FIG. 6.

Preferably, the latch means includes an offset crank 74 operatively connected to the pawl 46. The offset crank 74 is co-rotationally fixed on said shaft 48 together with the pawl 46 so that the two members are actuated simultaneously by the core element 52. The shaft 48 may include two or more flats to securely hold the offset crank 74. The offset crank 74 has a small hole disposed in its distal end for receiving an S-shaped terminal 76 on the second end 56 of the core element 52. Like the slug 70, the terminal 76 may also be cast of a zinc alloy in place over the second end 56 of the core element 52. A coil spring 78 is operatively disposed between the pawl 46 and the second base plate 34 for biasing the pawl 46 into engagement with the tooth 40. The coil spring 78 has one extending bent end which engages a small notch 80 in the bottom of the second base plate 34, and an inwardly extending bent end (not shown) which engages a flat of the shaft 48. Thus, the coil spring 78 reacts against the pawl 46 to lock the backrest cushion 14 in its vertical use position whenever the core element 52 slacks, i.e., at approximately 45° rotation of the seat cushion 12 from its horizontal use position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A passenger seat assembly (10) for a motor vehicle having independently mounted and manipulated seat and backrest cushions which can be individually folded to stowed positions for increasing cargo capacity, said assembly (10) comprising:

a seat cushion (12);

a backrest cushion (14);

seat support means (16) for supporting said seat cushion (12) above a vehicle floor (18) movably between a generally horizontal use position and a generally vertical stowed position;

backrest support means (32) for supporting said backrest cushion (14) adjacent said seat cushion (12) independently of said seat support means (16) and movably between a generally vertical use position and a generally horizontal stowed position;

latch means operatively associated with said backrest support means (32) for selectively locking said backrest cushion (14) in said vertical use position;

and characterized by delayed interlock means (50) operatively connected to said seat support means (16) for automatically unlocking said latch means in response to movement of said seat cushion (12) after said seat cushion (12) is moved from said horizontal use position and for automatically relocking said latch means in response to movement of said seat cushion (12) before said seat cushion (12) is moved to said horizontal use position such that said latch means is unlocked and relocked by said seat cushion (12) when spaced from said horizontal use position while said backrest cushion (14) remains in said vertical use position; said delayed interlock means (50) including a flexible motion transmitting core element (52) having a first end (54) operatively connected to said seat support means (16) and a second end (56) operatively connected to said latch means, and said delayed interlock means (50) further including a displacement cam (64) having an elongated receiver slot (68) for slidably connecting to said first end (54) of said core element (52).

2. An assembly (10) as set forth in claim 1 wherein said first end (54) of said core element (52) includes a slug (70) slidably disposed in said receiver slot (68) of said displacement cam (64) for transferring motion from said displacement cam (64) to said core element (52).

3. An assembly (10) as set forth in claim 2 wherein said slug (70) includes an anti-rotation fin (72) for preventing rotation of said slug (70) within said receiver slot (68).

4. An assembly (10) as set forth in claim 1 wherein said seat support means (16) includes a first base plate (20) and a seat bracket (22) pivotally connected to said first base plate (20) by a first axle (24), said displacement cam (64) being disposed about said first axle (24) for pivoting movement with said seat bracket (22).

5. An assembly (10) as set forth in claim 4 wherein said backrest support means (32) includes a second base plate (34) and a backrest bracket (36) pivotally connected to said second base plate (34), said backrest bracket (36) having a tooth (40) extending therefrom for engaging said latch means.

6. An assembly (10) as set forth in claim 5 wherein one of said second base plate (34) and said backrest bracket (36) having an arcuate track (42) formed therein, and the other of said second base plate (34) and said backrest bracket (36) having a stop pin (44) disposed in said track (42) for limiting arcuate travel of said backrest bracket (36) relative to said base plate (34).

7. An assembly (10) as set forth in claim 5 wherein said latch means includes a pawl (46) pivotally supported on said second base plate (34) for engaging said tooth (40).

8. An assembly (10) as set forth in claim 7 wherein said latch means includes a spring (78) operatively disposed between said pawl (46) and said second base plate (34) for biasing said pawl (46) into engagement with said tooth (40) whereby said backrest bracket (36) is fixed relative to said base plate (34) whenever said pawl (46) is in registry with said tooth (40).

9. An assembly (10) as set forth in claim 8 wherein said latch means includes an offset crank (74) operatively associated with said pawl (46) for actuating said pawl (46) in response to displacement of said core element (52).

10. An assembly (10) as set forth in claim 9 wherein said second end (56) of said core element (52) includes a terminal (76) attached to said offset crank (74) for transferring motion from said core element (52) to said offset crank (74).

11. An assembly (10) as set forth in claim 1 wherein said pawl (46) relocks said backrest cushion (14) when said seat cushion (12) is moved approximately 45° toward said horizontal use position.

12. An assembly (10) as set forth in claim 11 wherein a displacement cam (64) is operatively connected to said seat support means (16), said delayed interlock means (50) including a flexible motion transmitting core element (52) having a first end (54) operatively connected to said displacement cam (64) and a second end (56) operatively connected to said pawl (46).

13. An assembly (10) as set forth in claim 12 wherein said displacement cam (64) includes an elongated receiver slot (68) for slidably connecting to said first end (54) of said core element (52).

14. An assembly (10) as set forth in claim 13 wherein said first end (54) of said core element (52) includes a slug (70) slidably disposed in said receiver slot (68) of said displacement cam (64) for transferring motion from said displacement cam (64) to said core element (52).

15. A passenger seat assembly (10) for a motor vehicle having independently mounted and manipulated seat and backrest cushions which can be individually folded to stowed positions for increasing cargo capacity, said assembly (10) comprising:

a seat cushion (12);

a backrest cushion (14);

seat support means (16) for supporting said seat cushion (12) above a vehicle floor (18) movably between a generally horizontal use position and a generally vertical stowed position;

said seat support means (16) including a first base plate (20) and a seat bracket (22) pivotally connected to said first base plate (20) by a first axle (24);

backrest support means (32) for supporting said backrest cushion (14) adjacent said seat cushion (12) independently of said seat support means (16) and movably between a generally vertical use position and a generally horizontal stowed position;

said backrest support means (32) including a second base plate (34) and a backrest bracket (36) pivotally connected to said second base plate (34), said backrest bracket (36) having a tooth (40) extending therefrom;

a pawl (46) pivotally supported on said second base plate (34) for selectively engaging said tooth (40) of said backrest bracket (36) to lock said backrest cushion (14) in said vertical use position;

and characterized by delayed interlock means (50) operatively connected to said pawl (46) for automatically unlocking said pawl (46) in response to movement of said seat cushion (12) after said seat cushion (12) is moved from said horizontal use position and for automatically relocking said pawl (46) in response to movement of said seat cushion (12) before said seat cushion (12) is moved to said horizontal use position such that said latch means is unlocked and relocked by said seat cushion (12) when spaced from said horizontal use position while said backrest cushion (14) remains in said vertical use position, wherein said pawl (46) unlocks said backrest cushion (14) when said seat cushion (12) is moved approximately 45° from said horizontal use position.

* * * * *